United States Patent
Aoyagi et al.

(10) Patent No.: US 10,098,046 B2
(45) Date of Patent: Oct. 9, 2018

(54) COMMUNICATION SYSTEM, MOBILE DEVICE, AND NETWORK APPARATUS

(75) Inventors: Kenichiro Aoyagi, Tokyo (JP); Kiminobu Sugano, Tokyo (JP); Yuichiro Nakamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 155 days.

(21) Appl. No.: 13/816,413

(22) PCT Filed: Aug. 10, 2011

(86) PCT No.: PCT/JP2011/068311
§ 371 (c)(1),
(2), (4) Date: Apr. 22, 2013

(87) PCT Pub. No.: WO2012/020809
PCT Pub. Date: Feb. 16, 2012

(65) Prior Publication Data
US 2013/0210442 A1  Aug. 15, 2013

(30) Foreign Application Priority Data
Aug. 12, 2010  (JP) .................................. 2010-181169

(51) Int. Cl.
*H04W 36/00* (2009.01)
*H04W 48/18* (2009.01)
(Continued)

(52) U.S. Cl.
CPC ... *H04W 36/0077* (2013.01); *H04W 36/0022* (2013.01); *H04W 48/02* (2013.01); *H04W 48/18* (2013.01); *H04W 88/06* (2013.01)

(58) Field of Classification Search
CPC ............. H04W 36/22; H04W 36/0066; H04W 36/0022; H04W 28/08; H04W 12/08;
(Continued)

(56) References Cited

U.S. PATENT DOCUMENTS 8,606,273 B2 *  12/2013  Wang ..................... H04W 48/18
                                                    455/404.2
8,831,618 B2 *  9/2014  Otte .................. H04W 36/0061
                                                    370/332
(Continued)

FOREIGN PATENT DOCUMENTS

CN       101128045 A    2/2008
EP       2 320 700 A1   5/2011
(Continued)

OTHER PUBLICATIONS

3GPP TS 23.272 V8.1.0 (Sep. 2008) 3rd Generation Partnership Project; Technical Specification Group Services and System Aspects; Circuit Switched Fallback in Evolved Packet System; Stage 2 (Release 8).*
(Continued)

*Primary Examiner* — Nizar Sivji
(74) *Attorney, Agent, or Firm* — Osha Liang LLP

(57) ABSTRACT

The communication system according to the present invention includes: a mobile device 300 connectable to an LTE system and a 3G system; and an RNC 210 configured to control mobility of the mobile device 300 between the LTE system and the 3G system. When the mobile device sends the RNC 210 a request for connection to the 3G system instead of the LTE system because the LTE system imposes access restriction to restrict communication performed by the mobile device 300, the mobile device 300 incorporates mobility information in the request for connection, the mobility information indicating that the mobile device hands over from the LTE system. In addition, when acquiring the mobility information from the mobile device 300, the RNC 210 restrains the mobile device 300 from handing over to the LTE system.

1 Claim, 3 Drawing Sheets

(51) Int. Cl.
*H04W 48/02* (2009.01)
*H04W 88/06* (2009.01)

(58) Field of Classification Search
CPC ............... H04W 48/12; H04W 76/027; H04W 36/0077; H04W 48/18; H04W 48/02; H04W 88/06
USPC .................. 370/230, 331; 455/411, 436–441
See application file for complete search history.

(56) References Cited

U.S. PATENT DOCUMENTS

| | | | |
|---|---|---|---|
| 2010/0075665 A1 | 3/2010 | Nader et al. | |
| 2010/0111047 A1* | 5/2010 | Yang ................. | H04W 52/0216 370/336 |
| 2010/0113024 A1* | 5/2010 | Wu ...................... | H04W 36/14 455/436 |
| 2010/0248722 A1 | 9/2010 | Van Bussel et al. | |
| 2010/0331011 A1* | 12/2010 | Vikberg ............... | H04W 68/12 455/456.1 |
| 2011/0085611 A1* | 4/2011 | Laroia ................. | H04B 7/2678 375/260 |
| 2011/0110228 A1* | 5/2011 | de Franca Lima et al. | .. 370/230 |
| 2011/0149906 A1* | 6/2011 | Hong et al. ................. | 370/331 |
| 2011/0176512 A1* | 7/2011 | Sun ............... | 370/331 |
| 2011/0176536 A1* | 7/2011 | De Franca Lima ........................ | H04W 76/026 370/352 |
| 2011/0261726 A1* | 10/2011 | Hakkinen ............. | H04W 72/10 370/259 |
| 2011/0268083 A1* | 11/2011 | Ostrup ................. | H04W 48/18 370/331 |
| 2011/0269455 A1* | 11/2011 | Edwards ................. | H04W 4/12 455/426.1 |
| 2011/0294526 A1* | 12/2011 | Gafrick ................... | H04W 4/14 455/466 |
| 2012/0094661 A1* | 4/2012 | Frenger ............... | H04W 52/343 455/434 |
| 2013/0044696 A1* | 2/2013 | Dalal .................... | H04W 68/00 370/329 |
| 2013/0115917 A1* | 5/2013 | Tanaka et al. ................. | 455/411 |
| 2014/0133464 A1 | 5/2014 | Li et al. | |

FOREIGN PATENT DOCUMENTS

| | | | |
|---|---|---|---|
| JP | 2010045746 | * | 8/2008 |
| JP | 2008-270919 | A | 11/2008 |
| JP | 2009-206860 | A | 9/2009 |
| WO | 2009065461 | A1 | 5/2009 |
| WO | 2009120491 | A1 | 10/2009 |
| WO | 2010/021324 | A1 | 2/2010 |

OTHER PUBLICATIONS

International Search Report from PCT/JP2011/068311 dated Sep. 20, 2011 (2 pages).
3GPP TS 24.301 V8.6.0; "3rd Generation Partnership Project; Technical Specification Group Core Network and Terminals; Non-Access-Stratum (NAS) protocol for Evolved Packet System (EPS); Stage 3 (Release 8)"; Jun. 2010 (276 pages).
Written Opinion of the International Searching Authority w/translation from PCT/JP2011/068311 dated Sep. 20, 2011 (3 pages).
Official Action letter in counterpart New Zealand Application No. 607012 dated Oct. 25, 2013 (2 pages).
Office Action in counterpart Korean Patent Application No. 9-5-2015-020203728, dated Mar. 26, 2015 (13 pages).
Office Action in counterpart Chinese Patent Application No. 201180039595.6, dated Feb. 25, 2014 (22 pages).
Extended European Search Report issued in the counterpart European Patent Application No. 11816473.0, dated Mar. 23, 2017 (10 pages).
NTT DOCOMO; "RRC Connection Request after the redirection from E-UTRA"; 3GPP TSG-RAN-WG2 Meeting #70, R2-102778; Montreal, Canada; May 10-14, 2010 (3 pages).
Office Action issued in the counterpart European Patent Application No. 11816473.0, dated May 7, 2018 (6 pages).
ETSI TS 123 278 V9.0.0; "Digital cellular telecommunications system (Phase 2+); Universal Mobile Telecommunications System (UMTS); Customised Applications for Mobile network Enhanced Logic (CAMEL) Phase 4; Stage 2; IM CN Interworking (3GPP TS 23.278 version 9.0.0 Release 9)"; Jan. 2010 (155 pages).

* cited by examiner

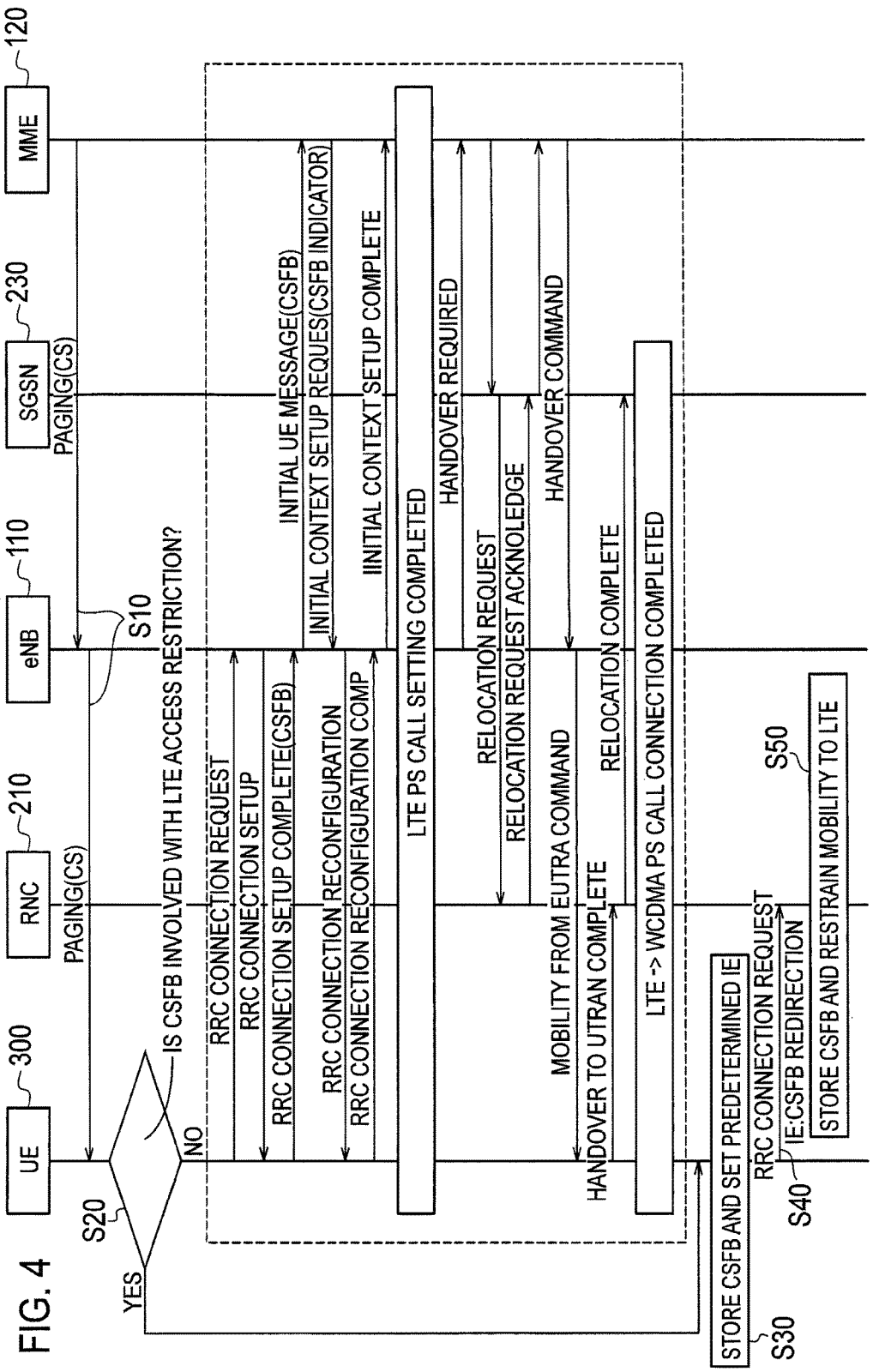

COMMUNICATION SYSTEM, MOBILE DEVICE, AND NETWORK APPARATUS

TECHNICAL FIELD

The present invention relates to a communication system including a mobile device connectable to multiple radio communication systems and a network apparatus, the mobile device and the network apparatus.

BACKGROUND ART

For a mobile device connectable to multiple radio communication systems such as a 3G (W-CDMA) system (hereinafter, a 3G) and an LTE system (hereinafter, an LTE), various methods (Inter-RAT mobility) of controlling the mobile device in between the multiple radio communication systems have been specified.

For example, it is specified that when the LTE to which the mobile device has transmitted a connection request has a certain access restriction rejecting acceptance of the connection request, the mobile device executes fallback (CSFB) to a CS domain in the 3G and executes call originating process in the 3G to which the mobile device performs the fallback (see Non-patent Document 1).

PRIOR ART DOCUMENT

Non-Patent Document

NON-PATENT DOCUMENT 1: 3GPP TS 24.301, Technical Specification Group Core Network and Terminals; Non-Access-Stratum (NAS) protocol for Evolved Packet System (EPS); Stage 3

SUMMARY OF THE INVENTION

The conventional control methods, however, have the following problem. Specifically, the 3G (i.e., UTRAN) does not recognize that the mobile device hands over to the 3G due to access restriction in the LTE. Thus, after the mobile device is connected to the 3G, the 3G might attempt to execute control to cause the mobile device to move to the LTE.

However, even though such control is executed, the mobile device cannot move to the LTE due to the access restriction imposed in the LTE. This means that unnecessary processing might be executed from the viewpoint of the whole radio communication systems.

Hence, an objective of the present invention is to provide a communication system, a mobile device, and a network device which are capable of, when access restriction in one radio communication system causes the mobile device to move to a different radio communication system, preventing the mobile device from handing over again to the one radio communication system.

A feature of the present invention is summarized as follows. A communication system includes a mobile device connectable to a first radio communication system and a second radio communication system of radio access technology different from that of the first radio communication system, and a network apparatus controlling mobility of the mobile device between the first radio communication system and the second radio communication system. When the mobile device sends the network apparatus a request for connection to the second radio communication system instead of the first radio communication system because the first radio communication system imposes access restriction to restrict communication performed by the mobile device, the mobile device incorporates mobility information in the request for connection, the mobility information indicating that the mobile device hands over from the first radio communication system, and when acquiring the mobility information from the mobile device, the network apparatus restrains the mobile device or a mobile device other than the mobile device from handing over to the first radio communication system.

A feature of the present invention is summarized as follows. A communication system includes a mobile device connectable to a first radio communication system and a second radio communication system of radio access technology different from that of the first radio communication system, and a network apparatus controlling mobility of the mobile device between the first radio communication system and the second radio communication system. When the mobile device sends the network apparatus a request for connection to the second radio communication system instead of the first radio communication system because the first radio communication system imposes access restriction to restrict communication performed by the mobile device, the mobile device incorporates incapability information in the request for connection, the incapability information indicating that the mobile device is incapable of executing communication through the first radio communication system, and when acquiring the incapability information from the mobile device, the network apparatus restrains the mobile device from handing over to the first radio communication system.

A feature of the present invention is summarized as follows. A communication system includes a mobile device connectable to a first radio communication system and a second radio communication system having radio access technology different from that of the first radio communication system, and a network apparatus controlling mobility of the mobile device between the first radio communication system and the second radio communication system. When the mobile device sends the network apparatus a request for connection to the second radio communication system instead of the first radio communication system because the first radio communication system imposes access restriction to restrict communication performed by the mobile device, the mobile device incorporates access restriction information in the request for connection, the access restriction information indicating that the request for connection to the second radio communication system is made due to the access restriction in the first radio communication system, and when acquiring the access restriction information from the mobile device, the network apparatus restrains the mobile device or a mobile device other than the mobile device from handing over to the first radio communication system.

A feature of the present invention is summarized as follows. A mobile device is connectable to a first radio communication system and a second radio communication system of radio access technology different from that of the first radio communication system. When the mobile device sends the network apparatus a request for connection to the second radio communication system instead of the first radio communication system because the first radio communication system imposes access restriction to restrict communication performed by the mobile device, the mobile device incorporates mobility information in the request for connection, the mobility information indicating that the mobile device hands over from first radio communication system.

A feature of the present invention is summarized as follows. A mobile device is connectable to a first radio communication system and a second radio communication system of radio access technology different from that of the first radio communication system. When the mobile device sends the network apparatus a request for connection to the second radio communication system instead of the first radio communication system because the first radio communication system imposes access restriction to restrict communication performed by the mobile device, the mobile device incorporates incapability information in the request for connection, the incapability information indicating that the mobile device is incapable of executing communication through the first radio communication system.

A feature of the present invention is summarized as follows. A mobile device is connectable to a first radio communication system and a second radio communication system having radio access technology different from that of the first radio communication system. When the mobile device sends the network apparatus a request for connection to the second radio communication system instead of the first radio communication system because the first radio communication system imposes access restriction to restrict communication performed by the mobile device, the mobile device incorporates access restriction information in the request for connection, the access restriction information indicating that the request for connection to the second radio communication system is made due to the access restriction in the first radio communication system.

A feature of the present invention is summarized as follows. A network apparatus controls mobility of a mobile device between a first radio communication system and a second radio communication system of radio access technology different from that of the first radio communication system. When acquiring, from the mobile device, mobility information indicating that mobility from the first radio communication system is performed, the network apparatus restrains the mobile device or a mobile device other than the mobile device from handing over to the first radio communication system.

A feature of the present invention is summarized as follows. A network apparatus controls mobility of a mobile device between a first radio communication system and a second radio communication system having radio access technology different from that of the first radio communication system. When acquiring, from the mobile device, incapability information indicating that the mobile device is incapable of executing communication through the first radio communication system, the network apparatus restrains the mobile device from handing over to the first radio communication system.

A feature of the present invention is summarized as follows. A network apparatus controls mobility of a mobile device between a first radio communication system and a second radio communication system having radio access technology different from that of the first radio communication system. When acquiring, from the mobile device, access restriction information indicating that a request for connection to the second radio communication system is made due to access restriction in the first radio communication system, the network apparatus restrains the mobile device or a mobile device other than the mobile device from handing over to the first radio communication system.

BRIEF DESCRIPTION OF THE DRAWINGS

FIG. 4 is a diagram showing a communication sequence of a radio communication system according to the embodiment of the present invention.

MODES FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Radio Communication System

Figure 1:
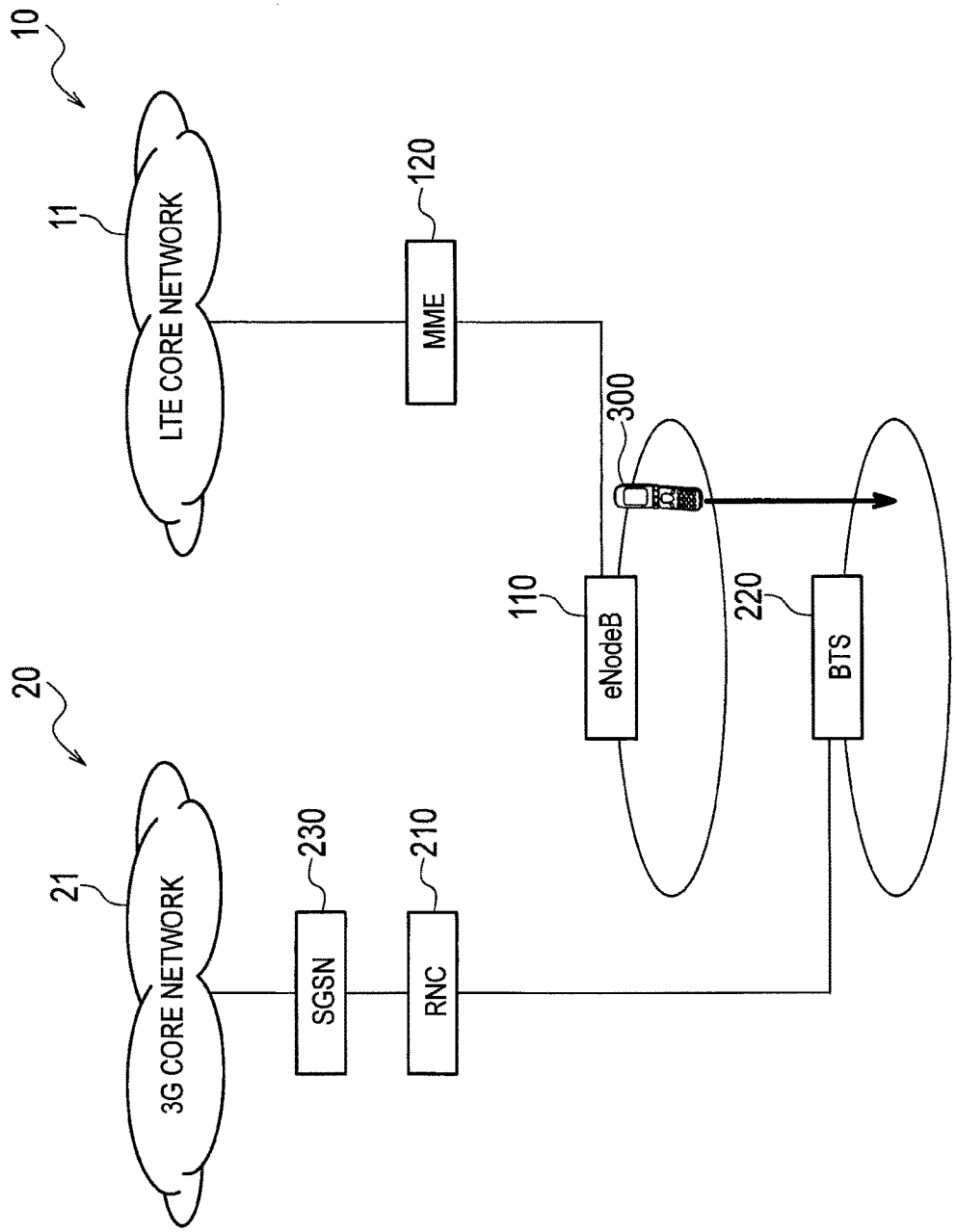
FIG. 1 is an overall schematic configuration diagram of a radio communication system according to an embodiment of the present invention.

FIG. 1 is an overall schematic configuration diagram of a radio communication system according to this embodiment. As shown in FIG. 1, the radio communication system according to this embodiment includes an LTE system 10 and a 3G system 20.

The LTE system 10 (a first radio communication system) is a radio communication system conforming to the LTE scheme. The 3G system 20 (a second radio communication system) is a radio communication system conforming to the 3G scheme (W-CDMA). That is, the LTE system 10 and the 3G system 20 use different radio access technologies (RATs).

The LTE system 10 includes an LTE core network 11, an eNodeB 110, and an MME 120. The 3G system 20 includes a 3G core network 21, an RNC 210, a BTS 220, and an SGSN (a Serving GPRS Support Node) 230.

The RNC 210 controls the BTS 220 and the mobile device 300. In this embodiment, the RNC 210 in particular forms a network apparatus configured to control mobility of the mobile device 300 between the LTE system 10 and the 3G system 20. In addition, the SGSN 230 knows a location of the mobile device 300 connected to a packet switching (PS) domain (not shown) and relays data addressed to the mobile device 300.

The mobile device 300 can wirelessly be connected to the LTE system 10 and the 3G system 20. Specifically, the mobile device 300 executes radio communication with the eNodeB 110 to thereby be connected to the LTE system 10. The mobile device 300 also executes the radio communication with the BTS 220 to thereby be connected to the 3G system 20. In this embodiment, the RNC 210 and the mobile device 300 form a communication system.

(2) Functional Block Configuration of Radio Communication System

Next, a description is given of a functional block configuration of main apparatuses among apparatuses forming the aforementioned radio communication systems.

Figure 2:
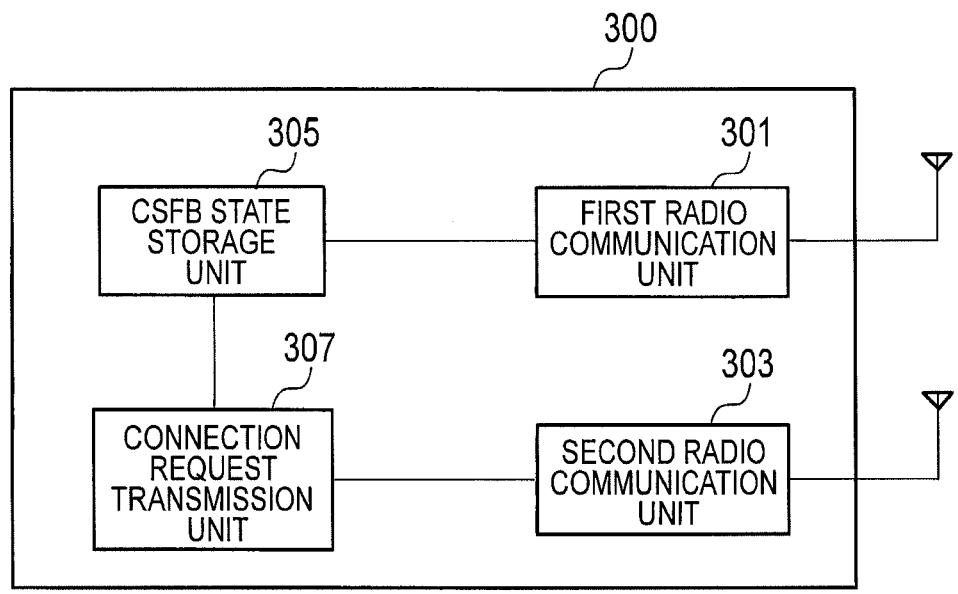
FIG. 2 is a functional block diagram of a mobile device 300 according to the embodiment of the present invention.
Figure 3:
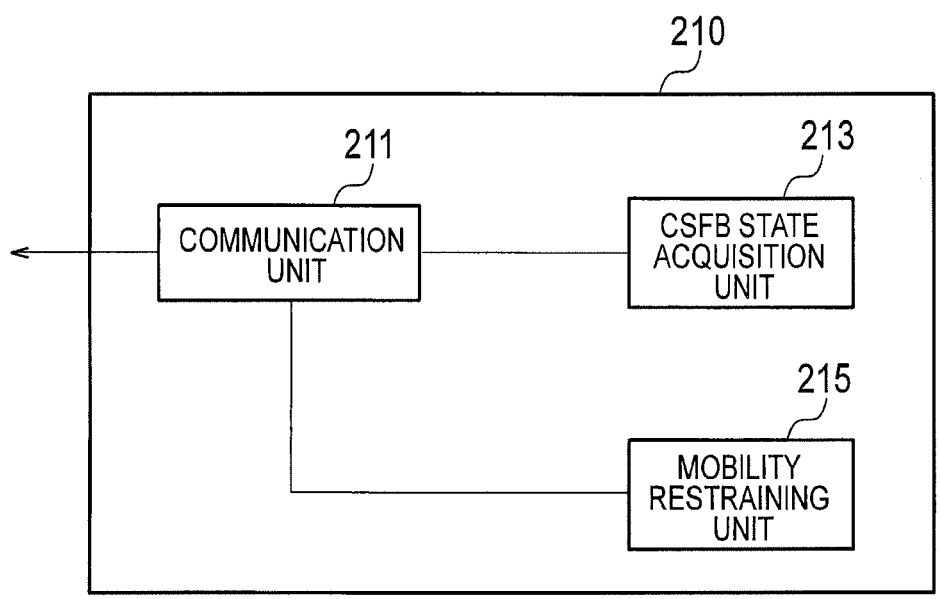
FIG. 3 is a functional block diagram of an RNC 210 according to the embodiment of the present invention.

FIG. 2 is a functional configuration diagram of the mobile device 300. In addition, FIG. 3 is a functional block configuration diagram of the RNC 210.

(2.1) Mobile Device 300

As shown in FIG. 2, the mobile device 300 includes a first radio communication unit 301, a second radio communication unit 303, a CSFB state storage unit 305, and a connection request transmission unit 307.

The first radio communication unit 301 executes LTE-scheme-compliant radio communication with the eNodeB 110. The second radio communication unit 303 executes 3G-scheme-compliant radio communication with the BTS 220.

The CSFB state storage unit 305 stores execution of CS (Circuit Switched) fallback (hereinafter, CSFB) by the mobile device 300 from the LTE system 10 to the 3G system 20. The CSFB state storage unit 305, in particular, stores CSFB to the 3G system 20 executed as a result of access restriction on the mobile device 300 in the LTE system 10.

The connection request transmission unit 307 transmits a connection request through the second radio communication unit 303, the connection request requesting connection to the 3G system 20. Specifically, as a result of access restriction in the LTE system 10 according to which communication performed by the mobile device 300 is restricted, when sending the RNC 210 a request for connection to the 3G system 20 instead of the LTE system 10 the connection request transmission unit 307 may incorporate mobility information in the connection request, the mobility information indicating that mobility (CSFB) from the LTE system 10 is performed.

(2.2) RNC 210

As shown in FIG. 3, the RNC 210 includes a communication unit 211, a CSFB state acquisition unit 213, and a mobility restraining unit 215.

The communication unit 211 executes the 3G-scheme-compliant communication with the mobile device 300.

The CSFB state acquisition unit 213 acquires a CSFB state of the mobile device 300 based on the mobility information included in the connection request transmitted from the mobile device 300. Specifically, the CSFB state acquisition unit 213 can store the mobility (CSFB) of the mobile device 300 to the 3G system 20 due to the access restriction in the LTE system 10.

The mobility restraining unit 215 restrains mobility of the mobile device 300 to the LTE system 10. Specifically, when acquiring the mobility information from the mobile device 300, the mobility restraining unit 215 restrains the mobile device 300 from handing over to the LTE system 10. Here, when acquiring the mobility information from the mobile device 300, the mobility restraining unit 215 may restrain a mobile device (not shown) other than the mobile device 300 from handing over to the LTE system 10 instead of the mobile device 300, the mobile device being connected to the 3G system 20.

(3) Operation of Radio Communication System

Next, an operation of the aforementioned the radio communication system will be described with reference to FIG. 4. FIG. 4 is a communication sequence of the radio communication system according to this embodiment.

In Step S10, the MME 120 transmits PAGING to the mobile device 300 through the eNodeB 110 to cause the mobile device 300 (UE) to perform fallback (CSFB) to the 3G system 20 (the CS domain) as shown in FIG. 4.

In Step S20, the mobile device 300 determines whether or not the CSFB to the 3G system 20 is involved with the access restriction in the LTE system 10.

When the CSFB to the 3G system 20 is not involved with the access restriction in the LTE system 10 (NO in Step S20), the mobile device 300 in standby in the LTE system 10 executes processing shown in a dotted square in accordance with an ordinary CSFB procedure.

On the other hand, when the CSFB to the 3G system 20 is involved with the access restriction in the LTE system 10 (YES in Step S20), in Step S30 the mobile device 300 in standby in the LTE system 10 stores therein the involvement of the CSFB to the 3G system 20 with the access restriction in the LTE system and sets predetermined INFORMATION ELEMENTS (IE). Specifically, the mobile device 300 sets "CSFB redirection" as IE. In other words, when the CSFB to the 3G system 20 is involved with the access restriction in the LTE system 10, the mobile device 300 does not execute the processing in the dotted square.

In Step S40, the mobile device 300 hands over to the 3G system 20 and sends the RNC 210 RRC CONNECTION REQUEST including "CSFB redirection" as IE.

In Step S50, based on RRC CONNECTION REQUEST received from the mobile device 300, the RNC 210 stores the involvement of the CSFB to the 3G system 20 with the access restriction in the LTE system 10. Further, the RNC 210 restrains the mobile device 300 from handing over again to the LTE system 10 based on the stored information.

(4) Modification

The embodiment described above uses the mobility information indicating that the mobility (CSFB) from the LTE system 10 is performed, but may be modified as follows.

(4.1) Modification 1

The mobile device 300 incorporates incapability information in the connection request (RRC CONNECTION REQUEST), the incapability information indicating incapability of executing communication through the LTE system 10. When acquiring the incapability information from the mobile device 300, the RNC 210 restrains the mobile device 300 from handing over to the LTE system 10. Specifically, what is required for the mobile device 300 is to make a notification "incapable of connecting to LTE" in a UE Capability notification in RRC CONNECTION SETUP COMPLETE transmitted after RRC CONNECTION REQUEST, or to not set IE: pre-redirection info.

(4.2) Modification 2

The mobile device 300 incorporates access restriction information in RRC CONNECTION REQUEST, the access restriction information indicating that a request for connecting to the 3G system 20 is made due to the access restriction in the LTE system 10. When acquiring the access restriction information from the mobile device 300, the RNC 210 restrains the mobile device 300 from handing over to the LTE system 10. Specifically, instead of "CSFB redirection", the RNC 210 may set IE: pre-redirection info or may set IE which is to be set at the time of redirection. Here, when acquiring the mobility information from the mobile device 300, the RNC 210 may restrain a mobile device (not shown) other than the mobile device 300 from handing over to the LTE system 10 instead of the mobile device 300, the mobile device being connected to the 3G system 20.

(5) Advantageous Effects

According to the radio communication system according to this embodiment, when the mobility information indicating that the mobility from the LTE system 10 is performed is incorporated in the connection request from the mobile device 300 and when the RNC 210 acquires the mobility information, the RNC 210 restrains mobility to the LTE system 10.

For this reason, even if the mobile device 300 performs the mobility (CSFB) to the 3G due to the access restriction in the LTE, the RNC 210 can recognize the state and thus restrains the mobile device 300 from handing over again to the LTE system 10. Note that in the conventional method, no notification is made to the 3G system 20 that the mobile device 300 hands over from the LTE system 10.

Moreover, the radio communication system according to this embodiment prevents the mobile device from handing over to the LTE and thus makes it possible to reduce execution of unnecessary processing from the viewpoint of the whole radio communication systems.

Further, as shown in Modification 1 and Modification 2, the same effects can be obtained also in the case where the incapability information indicating incapability of communication through the LTE system 10 is used or where the access restriction information indicating that the access restriction is performed in the LTE system 10 is used.

(6) Other Embodiments

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, the aforementioned embodiments of the present invention have described the LTE system 10 and the 3G system 20 (W-CDMA) as examples, but the present invention may be applied to CSFB between the LTE and CDMA 2000 or between the LTE and a GSM. The present invention is not limited to the CSFB and may also be applied to a case where Packet Switching (PS) calls are restricted.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2010-181169 (filed on Aug. 12, 2010) is incorporated herein by reference.

INDUSTRIAL APPLICABILITY

According to a feature of the present invention, when access restriction in one radio communication system causes a mobile device to move to a different radio communication system, the mobile device can be prevented from handing over again to the one radio communication system.

EXPLANATION OF THE REFERENCE NUMERALS

10 . . . LTE system
11 . . . LTE core network
20 . . . 3G system
21 . . . 3G core network
110 . . . eNodeB
210 . . . RNC
211 . . . communication unit
213 . . . CSFB state acquisition unit
215 . . . mobility restraining unit
220 . . . BTS
230 . . . SGSN
300 . . . mobile device
301 . . . first radio communication unit
303 . . . second radio communication unit
305 . . . CSFB state storage unit
307 . . . connection request transmission unit

The invention claimed is:

1. A mobile device connectable to an LTE system and a 3G system of radio access technology different from that of the LTE system, the mobile device comprising:
a processor that determines if a Circuit Switched fallback to the 3G system is involved with access restriction applied by the LTE system that restricts communication performed by the mobile device; and
a transmitter that sends a network apparatus in the 3G system a first Radio Resource Control (RRC) connection request for connection to the 3G system as an alternative to the LTE system when the Circuit Switched fallback is involved with the access restriction,
wherein the transmitter sends a base station in the LTE system a second RRC connection request when the CSFB is not involved with the access restriction, and
wherein the first RRC connection request includes mobility information indicating that the mobile device performs Circuit Switched fallback from the LTE system due to the access restriction.

* * * * *